United States Patent
Baugher et al.

[11] Patent Number: 5,819,043
[45] Date of Patent: Oct. 6, 1998

[54] MULTIMEDIA RESOURCE RESERVATION SYSTEM

[75] Inventors: Mark John Baugher; Alan Palmer Stephens, both of Austin, Tex.

[73] Assignee: International Business Machines Corporation, Armonk, N.Y.

[21] Appl. No.: 747,313

[22] Filed: Nov. 12, 1996

Related U.S. Application Data

[62] Division of Ser. No. 85,275, Jun. 29, 1993, Pat. No. 5,640,595.

[51] Int. Cl.$^6$ .................................................. G06F 13/00
[52] U.S. Cl. ........................... 395/200.52; 395/200.56; 395/651; 395/830
[58] Field of Search .................. 395/200.06, 200.02, 395/200.2, 651, 652, 653, 200.57, 200.58, 200.59, 200.56, 200.52, 200.61, 200.65, 830; 370/443, 468, 453, 457

[56] References Cited

U.S. PATENT DOCUMENTS

| | | | |
|---|---|---|---|
| 4,965,798 | 10/1990 | Mostafa et al. | 370/468 |
| 5,353,432 | 10/1994 | Richek et al. | 395/500 |
| 5,404,424 | 4/1995 | Zhao et al. | 370/453 |

*Primary Examiner*—Dinh C. Dung
*Attorney, Agent, or Firm*—Jeffrey S. LaBaw

[57] ABSTRACT

A system, method and program for adjusting a resource reservation for multimedia and normal traffic. An initialization file is used for storing data concerning a resource including a current maximum resource reservation for multimedia traffic. The user is presented the current maximum resource reservation, preferably in a graphical user interface to allow the user to adjust the resource reservation to a new maximum resource reservation in the initialization file. One preferred graphical user interface presents a range of resource reservations is represented as a scale and the current maximum resource reservation as a point on the scale. The resource reservation is used by the operating system or other software for reserving a portion of the resource. The remainder of the resource is allocated to normal traffic.

18 Claims, 12 Drawing Sheets

CURRENT RESERVATIONS TABLE

| CAPACITY TABLE | | | | | | |
|---|---|---|---|---|---|---|
| SCSI DISK | #1 | #2,000,000 Bps | 75% | Session #1<br>Session #2 | 150 KBps<br>175 KBps | 50 K<br>40 K | 0.3 s<br>0.3 s |
| NET ADAPTER<br>TOKEN RING | #0 | 16 Mbps | 80% | Session #1 | 1.2 Mbps | 50 K | 3 s |
| NET ADAPTER<br>ETHERNET | #1 | 10 Mbps | 40% | Session #2 | 1.4 Mbps | 40 K | 3 s |
| MICRO<br>CHANNEL<br>SYSTEM BUS | | 34 MBps | 50% | Session #1<br>Session #2 | 300 KBps<br>350 KBps | 50 K<br>40 K | 0.3 s<br>0.3 s |

FIG. 9

MULTIMEDIA RESOURCE RESERVATION SYSTEM

This Application is a divisional of Ser. No. 08/085,275, filed Jun. 29, 1993 now U.S. Pat. No. 5,640,595.

Related patent applications include commonly assigned, copending patent application, U.S. Ser. No. 08/085,264, now U.S. Pat. No. 5,694,548, entitled "System and Method for Providing Multimedia Quality of Service Sessions In A Communications Network", here by incorporation by reference; commonly assigned, copending patent application U.S. Ser. No. 08/085,274, now U.S. Pat. No. 5,388,097, entitled "System and Method For Bandwidth Reservation for Multimedia Traffic In Communications Network"; commonly assigned, copending patent application U.S. Ser. No. 08/084,053, now U.S. Pat. No. 5,581,703, "Method and Apparatus for Reserving System Resources to Assure Quality of Service"; hereby incorporated by reference.

BACKGROUND OF THE INVENTION

The present invention relates to data processing systems. More particularly, it relates to such systems which reserve resources for multimedia connections or sessions.

It has long been known to provide computer systems coupled together by means of digital communication networks so that users of the individual workstations may communicate with one another over the network. More recently, desktop conferencing, remote presentations, and other multimedia applications have been proposed between network users. However, such multimedia applications, as they are associated with data-intensive sound, voice, and video flows, require concomminant high bandwidth communication links between distributed computing systems with minimal communication delay, maximum throughput, and instantaneous burst communication capability. The requirements of such multimedia applications make scheduling appropriate resources to provide for necessary quality of service for Multimedia traffic while maintaining network availability for normal bandwidth traffic very difficult.

It is recognized that certain data in a network, such as that associated with multimedia, may require priority handling. A "quality of service" has been defined in the literature, which seeks to describe various parameters which may be specified to define certain minimum requirements which must be met for transmission of given data types over the network. See, for example, quality of service standards set forth in the OSI TP4 interface (publication reference:) and the quality of service standards defined in CCITTQ.931 (ISDN), Q.933 (frame relay), and Q.93B (B-ISDN ATM) drafts. As yet another example, there is a priority mechanism in the IEEE 802.5 specification for the Token Ring network. A station on the ring with a high priority frame to send may indicate this in an access control field of a passing frame. When a station sending the frame releases the token, it releases the token at the priority of the AC field, and eventually sets it back to its original priority as specified in an IEEE 802.5 medium access control protocol. The IEEE standard and implementations thereof merely specify a protocol for increasing and decreasing priority, but each station is unconstrained in its use of priority beyond this protocol.

This in turn gives rise to a serious problem associated with the prior art. In seeking to accommodate situations in which a high priority channel is required to guarantee real time service for multimedia traffic, one approach, since each station is unconstrained, has been for users to indiscriminately increase the priority of their flows to the point where no guarantees for multimedia quality of service were possible in that no discrimination was being provided, e.g., all the users were simply increasing their priorities. This also has the effect of choking off normal nonpriority traffic entirely.

As yet another example of this, unconstrained use of priorities has resulted in bridges and routers, loading so much high priority data on them as to flood the token ring with this priority traffic such that multimedia traffic obtains no guaranteed priority. Again, this results from no discrimination between differing connections, sessions, and transmit operations.

Clearly other instances in the communication art have recognized the notion of need for differing priority of data types, whether in the form of multiple channels with different priorities (such as the IBM LAN Streamer Token Ring Adapter Card with two transmit channels, and the 100M BPS Ethernet System with priority channels) and the synchronous/synchronous approach of, for example, the FDDI standards, a representative example of which is the FDDI SMT 7.X.

Moreover, it is clear in the literature that the notion of scheduling data in differing priorities is well known. See for example Liu and Layland, *Scheduling Algorithms For Multiprogramming in a Hard-Real-Time Environment*, Journal of the Association for Computing Machinery, Vol. 20, #1, January, 1973, where "rate-monotonic priority assignment" is discussed, page 50. Also see, for example, Dominico Ferrari, *A Scheme for Real Time Channel Establishment in Wide Area Networks*, IEEE Journal of Selected Areas in Communications, Vol. 8, #3, April, 1990, page 368. In this reference modification of an earliest due date (EDD) policy is presented which governs differing levels of priority assigned to tasks.

Similarly, the notion of specifying performance requirements in real time communication services is further addressed in another reference to Dominico Ferrari, *Client Requirements for Real-Time Communication Services*, IEEE Communications Magazine, November 1990, page 65, wherein it is noted that a client and server will negotiate a specification for their respective requirements for services including delay bounds, throughput bounds, and the like.

The situation is complex. Computer system devices such as network adapters, buses, disks and host processors are diverse in their capabilities in ways that are not easily captured by device specifications. A Priority Token Ring adapter, for example, will be able to reserve more bandwidth for multimedia applications if it can capture a token immediately after releasing it. A Token Ring adapter which cannot capture its token immediately upon releasing it will give other stations on the ring more opportunities to capture the token and thereby reduce the amount of ring bandwidth which a computer serviced by the slow adapter can reserve. This capability is influenced by the speed of the processor, the number of pad symbols introduced onto the ring following a transmission, and other factors which make it difficult predict what guarantees can be provided to multimedia streams.

Just as devices have a wide variety of capabilities, multimedia steams have a great variety of rates: CD-ROM audio may stream data at 175 kilobytes per seconds (KBps), compressed, digital video may run at 150 KBps or greater while still frame audio rates are about 35 kilobytes per second or less. Multimedia computers may also have a variety of delay and burst requirements depending upon configuration.

Thus, whatever means is devised to automatically reserve system or network resources to high bandwidth traffic is likely to be nonoptimal, particularly as new technologies and multimedia file types evolve. Too much multimedia traffic for the reserved resources will result in overutilization causing glitches or jitter in the multimedia sessions. If too much resource is reserved for multimedia traffic to solve the problem above, normal data traffic will be prevented from transmission. The applicants have recognized a need to adjust the allocation of resources devoted to a multimedia session. Further, because a human being is the most adaptable control means yet devised, the applicants propose a user interface operable by the network administrator or other system user. The interface allows one to adjust a default or calculated maximum resource reservation value to a new value to better optimize performance.

SUMMARY OF THE INVENTION

Therefore, it is an object of the present invention to tune resource reservation so that multimedia traffic receives adequate guarantees of quality of service, while reserving sufficient resource for normal data traffic.

This and other objects are accomplished by system method and program for adjusting a resource reservation for multimedia and normal traffic. An initialization file is used for storing data concerning a resource including a current maximum resource reservation for multimedia traffic. The user is presented the current maximum resource reservation, preferably in a graphical user interface, to allow the user to adjust the resource reservation to a new maximum resource reservation in the initialization file. One preferred graphical user interface presents a range of resource reservations is represented as a scale and the current maximum resource reservation as a point on the scale. The resource reservation is used by the operating system or other software for reserving a portion of the resource. The remainder of the resource is allocated to normal traffic.

The initialization file may originally be built from default data concerning the maximum resource reservation for a particular resource. Alternatively, the resource data may be entirely entered by the user. Yet other means for establishing the initialization file include searching a computer system coupled to the network for an application file containing the resource data or benchmarking the resource to determine the resource data.

BRIEF DESCRIPTION OF THE DRAWINGS

These and other features, advantages and objects will be more easily understood with reference to the following description and attached drawings.

FIG. 9 shows a resource reservation table including a resource capacity table and current reservations table.

DETAILED DESCRIPTION OF THE PREFERRED EMBODIMENT

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PS/2 (TX) series of computers could be used in the present invention. For additional information on IBM's PS/2 series of computers, the reader is referred to *Technical Reference Manual Personal* Systems/2 Model 50, 60 systems IBM Corporation, Part No. 68X2224 Order Number S68X-2224 and *Technical Reference Manual Personal Systems/2 (Model 80) IBM Corporation* Part No. 68X 2256 Order Number S68X-2254. One operating system which an IBM PS/2 personal computer may run is IBM's OS/2 2.0 (TM). For more information on the IBM OS/2 2.0 Operating System, the reader is referred to *OS/2 2.0 Technical Library, Programming Guide Vol.* 1, 2, 3 Version 2.00 Order Nos. 10G6261, 10G6495, 10G6494.

In the alternative, the computer system might be in the IBM RISC System/6000 (TM) line of computers which run on the AIX (TM) operating system. The computers which run on the AIX (TM) operating system. The various models of the RISC System/6000 are described in many publications of the IBM Corporation, for example, *RISC System/ 6000, 7073 and 7016 POWERstation and POWERserver Hardware Technical* reference, Order No. SA23-2644-00. The AIX operating system is described in *General Concepts and Procedure—AIX Version 3 for RISC System/*6000 Order No. SC23-2202-00 as well as other publications of the IBM Corporation.

Figure 1:
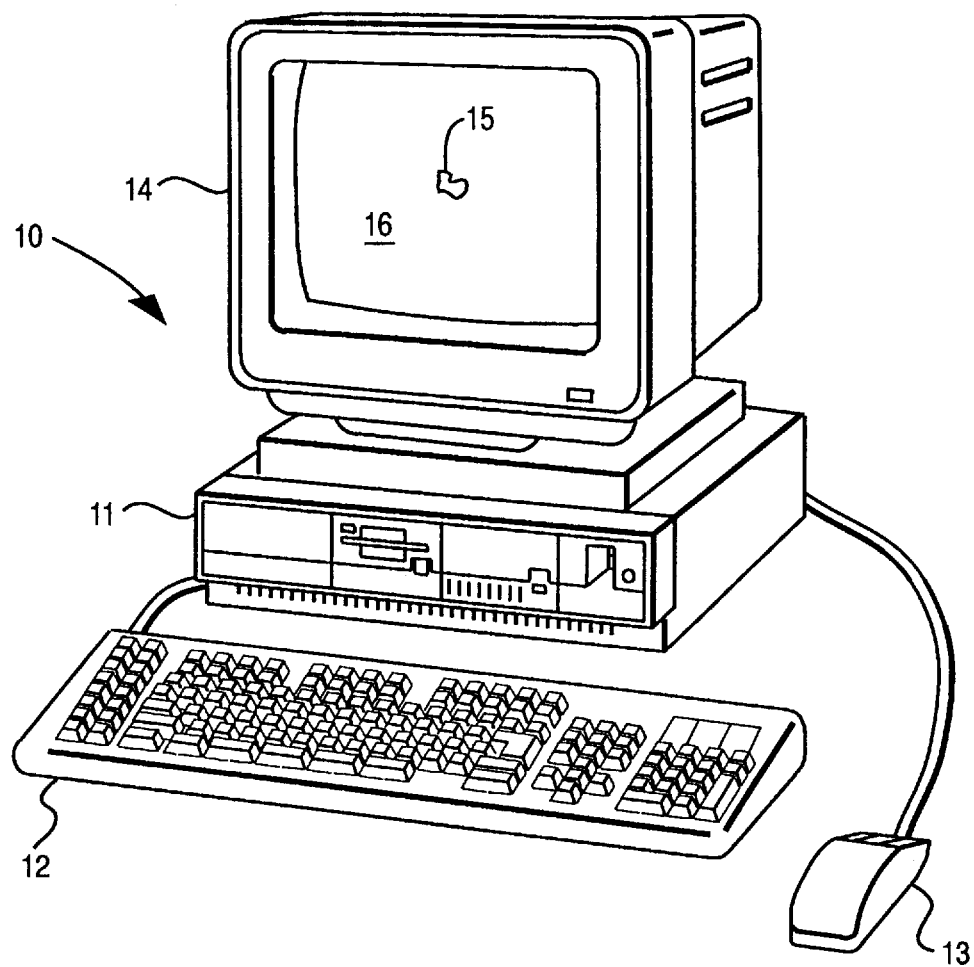
FIG. 1 depicts a computer system including system display, system unit, mouse and keyboard.

In FIG. 1, a computer 10, comprising a system unit 11, a keyboard 12, a mouse 13 and a display 14 are depicted. The screen 16 of display device 14 is used to present the graphical user interface (GUI). The graphical user interface supported by the operating system allows the user to use a point and shoot method of input, i.e., by moving the mouse pointer 15 to an icon representing a data object at a particular location on the screen 16 and pressing one of the Rouse buttons to perform a user command or selection.

Figure 2:
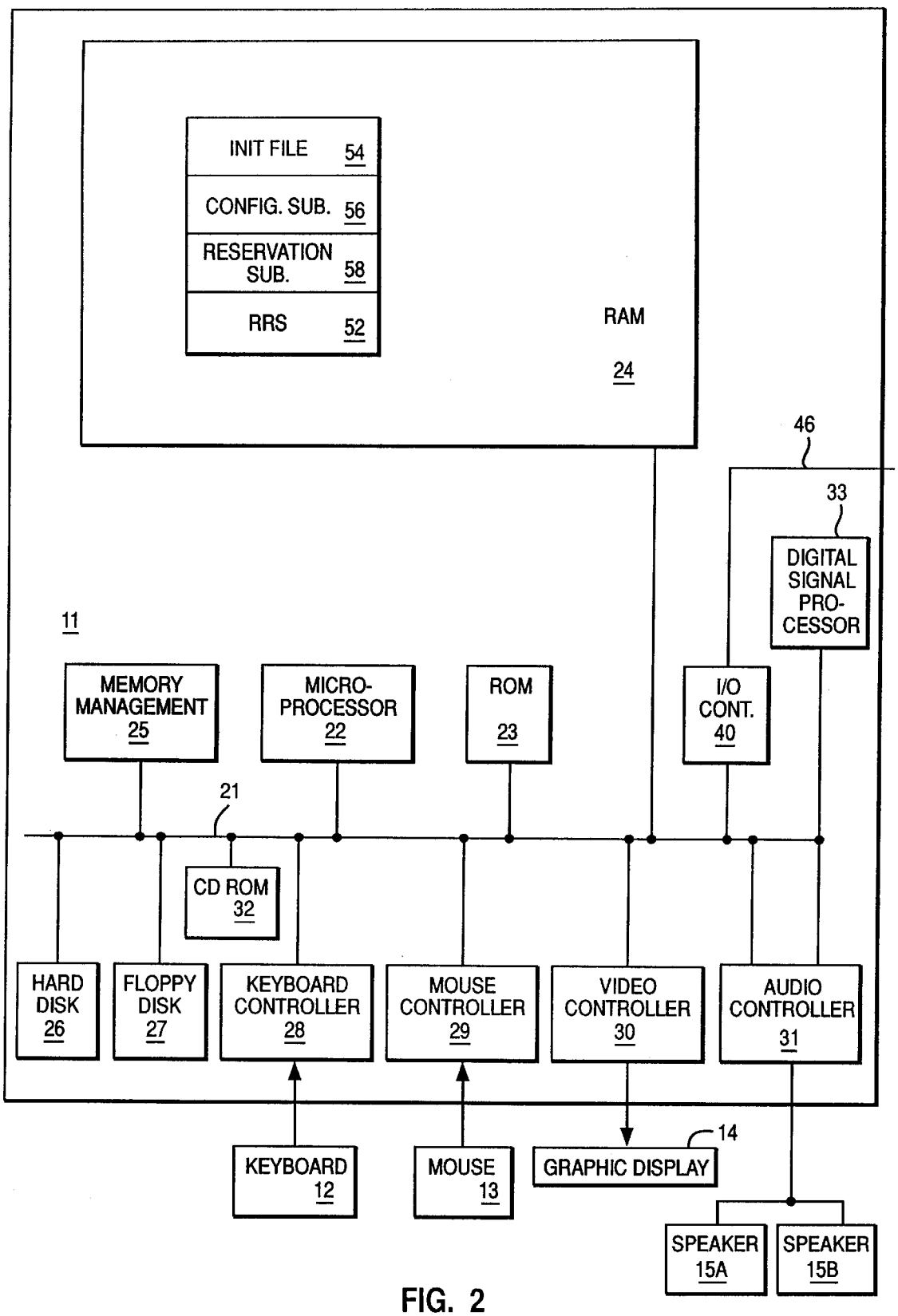
FIG. 2 is an architectural block diagram of the computer system in FIG. 1.

FIG. 2 shows a block diagram of the components of the personal computer shown in FIG. 1. The system unit 11 includes a system bun or plurality of system buses 21 to which various components are coupled and by which communication between the various components is accomplished. The microprocessor 22 is connected to the system bus 21 and is supported by read only memory (ROM) 23 and random access memory (RAN) 24 also connected to system bus 21. A microprocessor in the IBM multimedia PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32, also coupled to the system bus 21, is used to store a large amount of data, e.g., a multimedia program or large database.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. The speakers 15a and 15b may be used to present audio objects to the user. An I/O controller 40 such as a Token Ring Adapter enables communication over a network 46 to other similarly configured data processing systems.

One of the preferred implementations of the present invention is as a set of instructions in a code module resident in the random access memory 24. Until required by the computer system, the set of instructions may be stored in another computer memory, for example, in the hard disk drive 26, in an optical disk for eventual use in the CD ROM 32 or in a floppy disk for eventual use in the floppy disk drive 27. As shown in the figure, resident in RAM 24 is the resource reservation system 52, which consists of three major parts. The initialization file 54 permits the system administrator or other user to declare devices which cannot be automatically determined by searching the system in their network and to allocate the proportion of a computer system resources which can be reserved for realtime, multimedia purposes. The configuration subsystem 56 parses the initialization file 54 and reports device, connectivities, speed and the amount of reservable capacity in a log file. The reservation subsystem 60 either admits or refuses access to priority service based on the current level of reservation within the network.

Figure 3:
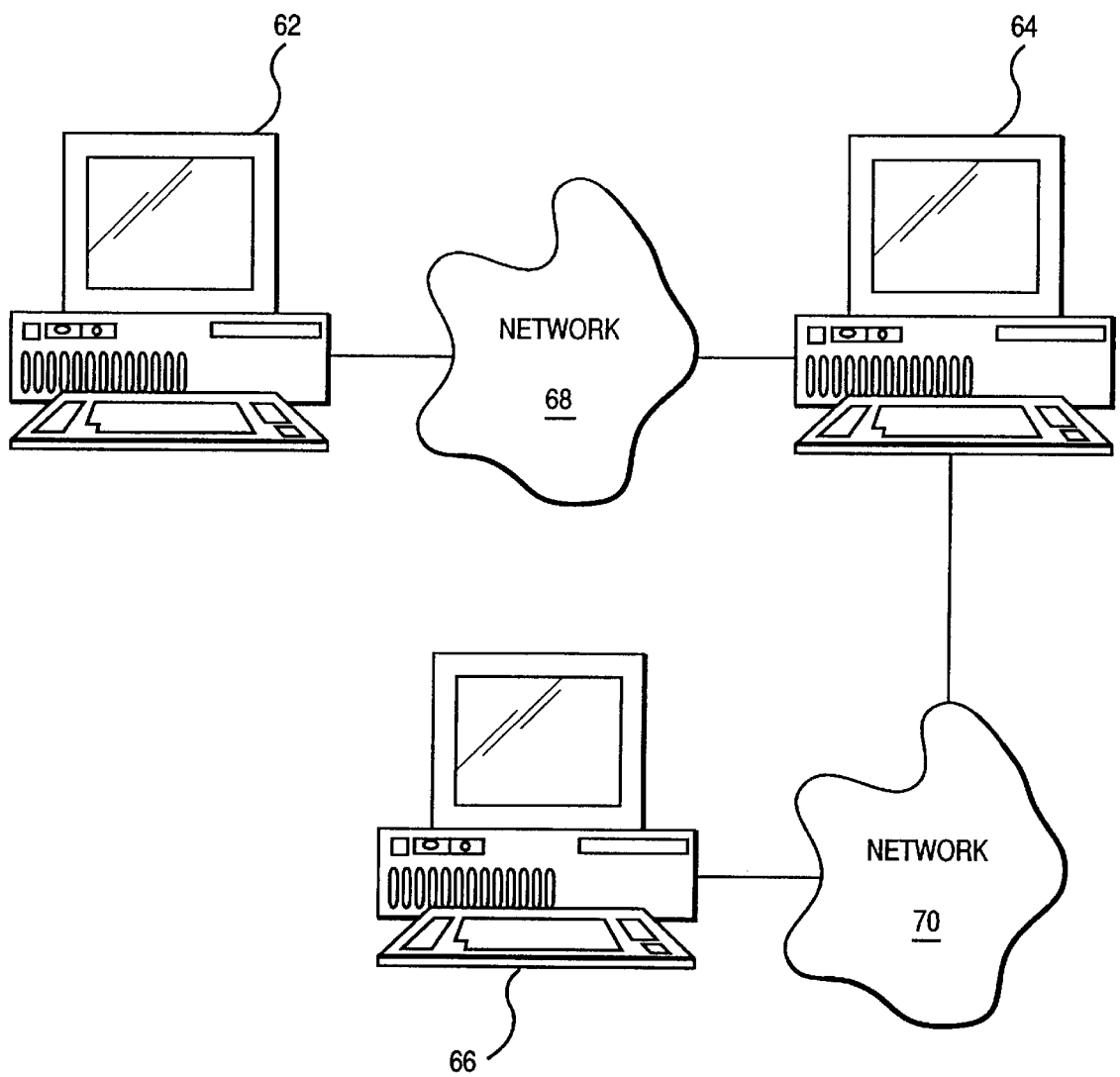
FIG. 3 is an illustration of a data processing system including three workstations interconnected by a network in accordance with the subject invention.

FIG. 3 illustrates a data processing system comprising a three workstations 62, 64, and 66 interconnected by a pair of data networks 68 and 70, so as to permit communication between the workstations. Although only three workstations are depicted for sake of simplicity, one skilled in the art would understand that a multitude of workstations could be connected to the networks. It is assumed that the data processing system shown in FIG. 3 is of a type which permits concurrent real-time communication between the users. The networks operate according to a conventional network protocol, such as the token ring protocol described in *Token Ring Network Architecture* reference, SC30-3374, IBM, 1989.

FIG. 3 depicts only one possible hardware, configuration for a data processing network. Other configurations are possible. For example, the data processing system could be based upon a star network, or a host processor connected to a plurality of dumb terminals, or could further be based upon a plurality of remote processors connected by a communication network. The networks could also be based upon the telephone network, an ISDN network, or any other "dial up" networks. Moreover, the workstations could be located within the single workspace or within a local area, or could be remote from one another. A source for detailing technical planning information for configuring a network of workstations in accordance with the invention, is the *IBM Extended Services for OS/2 Example Scenarios Manual*, 1991.

Multimedia computing is the processing of various media, such as video, waveform audio, musical instrument digital interface (MIDI) streams, animation, graphics, and text. Media processing includes the capture, authoring (editing) and playback of media streams as well as other data processing applications. Multimedia documents which are stored on some non-volatile medium, such as a disk, are referred to as recorded multimedia applications. There are also live multimedia applications in which two or more people commumicate with each other at the same time using a computer. Live multimedia applications are normally conducted across space and time indicating that live multimedia is inherently distributed. Even recorded multimedia applications require distributed file system services to share large volumes of stored media, such as video disk, audio information, or computer-generated images. Thus, it is critical that a prioritizing scheme in accordance with the invention for multimedia applications includes support for a distributed environment.

To reduce design complexity, most networks are organized as a series of layers, each one built upon its predecessor as described in *Computer Networks*, Tannenbaum, Andrew S., Prentice Hall (1988) and *OSI, A Model for Computer Communications Standards*, Black, Ulyess, Prentice Hall, 1991. The number of layers, the name of each layer, contents, and function of each layer differ from network to network. However, in each network, the purpose of the layers is to offer certain services to the higher layers, shielding those layers from the details of how the offered services are actually implemented. The purpose, function, and details of each of the layers and their interaction is set forth in the previously noted references and is familiar to communication programmers ordinarily skilled in the art.

The transport layer accepts data from the session layer, splits it up into smaller units and passes the units to the network layer to ensure that the pieces all arrive at the other end. Details of the transport layer and how it fits into the OSI architecture are shown in FIG. 18 of the Tannenbaum book and described in the related pages. A representative of network architecture that provide technical standards documents for the networking framework are, *ISO/IEC JTC 1/SC 21 Information Retrieval, Transfer and Management for OSI Secretariat*: USA (ANSI) (3294) *Basic Reference Model Management Framework* (7498-4), and *Management Information Model* (3324) ISO, 1989.

Priority assurance is an important factor in ensuring QOS, and is enabled by operation of a component which may be implemented in hardware logic or software. The component regulates access to the priority queue or transmit channel that is attached to the shared medium local area network section. Access to the priority queue or transmit channel will pass through this component, thus subjecting all communication transactions to rejection or tracking by the component. A more detailed discussion of this component and the related station's bandwidth manager component are described in *Network Priority Management*, U.S. patent application Ser. No. 930,587, filed Aug. 17, 1992 by M. J. Baugher et al. which is hereby incorporated by reference.

Figure 4:
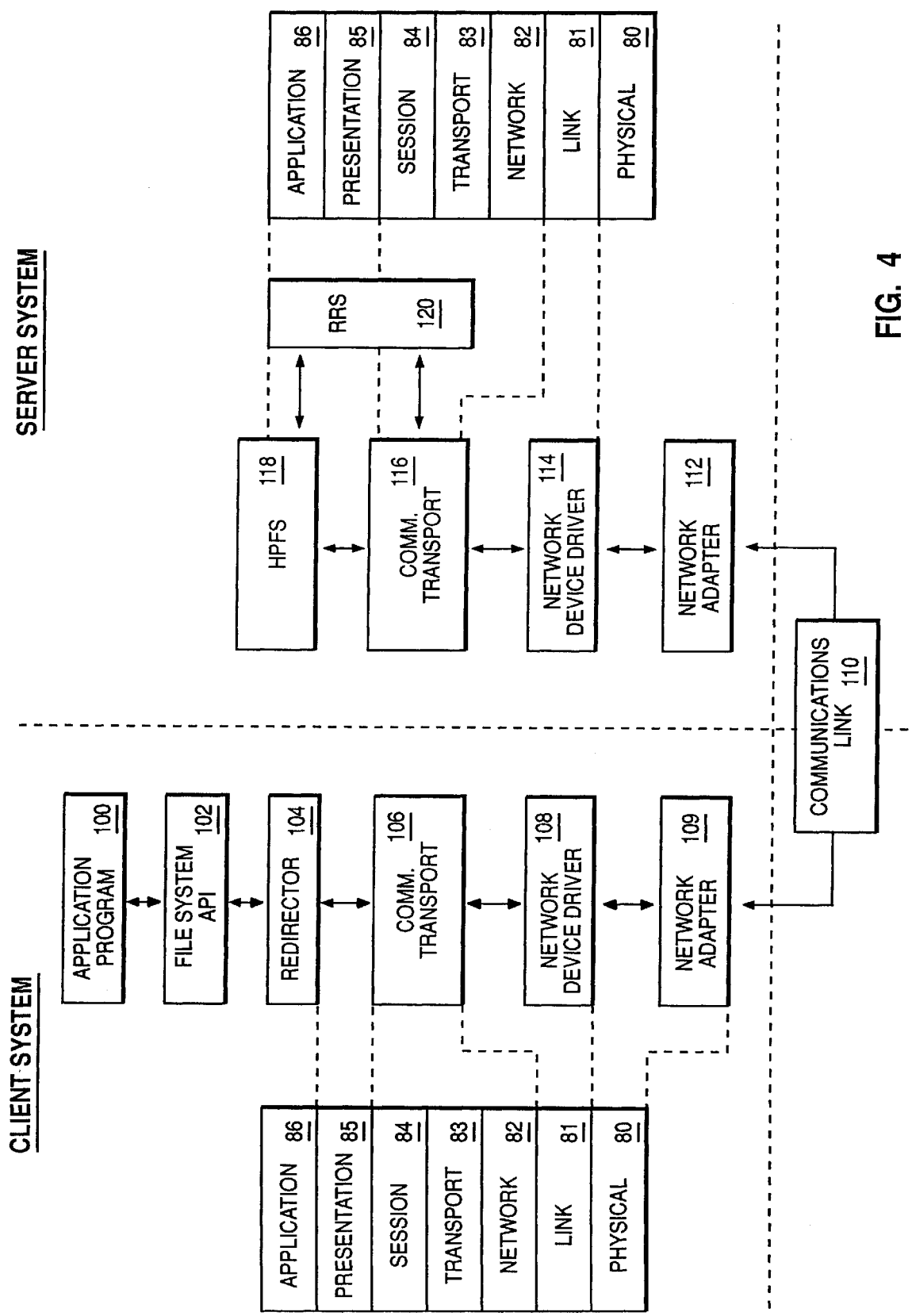
FIG. 4 is block diagram of preferred layered open system connection module showing the relationships of components of the subject invention to the layers.
Figure 5:
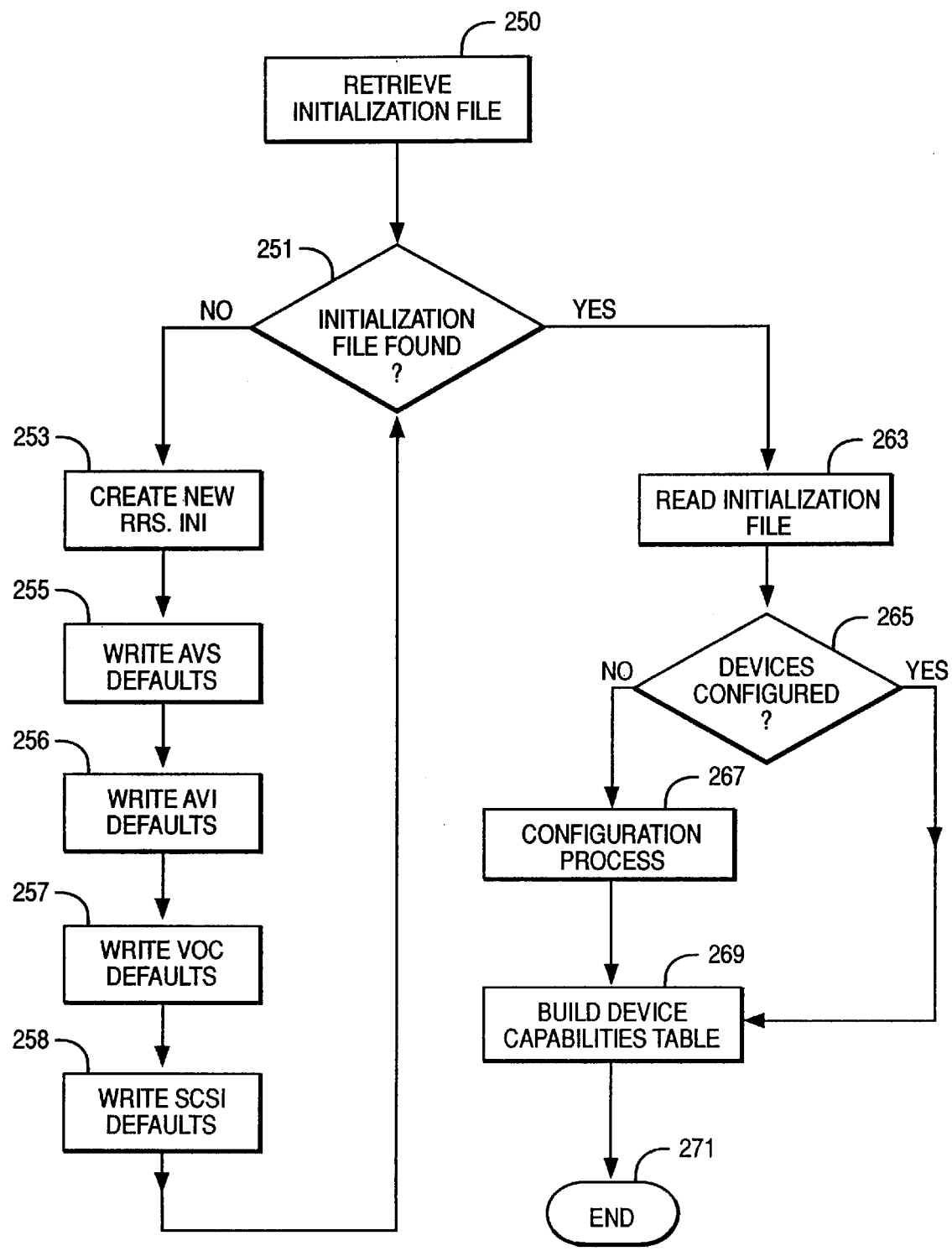
FIG. 5 is a flow diagram for retrieving and/or constructing an initialization file.

Turning now to FIG. 4, depicted there is a schematic representation of several forms of a multilayered computer communication network model based upon the OSI layered reference model. Further detail of this OSI and related IEEE models may be found in *OSI, A Model for Computer Communications Standards*, infra. The first five layers of the OSI model are shown in FIG. 4 as reference numerals 8–88. The lowest layer is the physical layer OSI 1, 80, which is responsible for implementing a physical circuit between data terminal equipment and data circuit terminating equipment.

The data link or second layer, OSI 2, 81, is responsible for transfer of data across the link. The third or network layer, OSI 3, 82, specifies the interface of the user into a network and also defines network switching/routing and communications between networks. The fourth or transport layer, OSI 4, 83, provides an interface between the data communications network and the upper three layers. This layer is of particular interest inasmuch as it provides the user options in obtaining certain levels of quality, and is designed to keep the user isolated from some of the physical and functional aspects of the network.

The fifth or session layer, OSI 5, 84, serves as a user interface into the transport layer below, providing a means for exchange of data between users such as simultaneous transmission, alternate transmission, checkpoint procedures and the like. The remaining two layers, the presentation layer and application layer (not depicted), ensure that user applications can communicate with each other and further concern the support of the end-user application process.

There are many types of quality of service parameters known in the art, these parameters are described in detail in commonly assigned copending patent application U.S. Ser. No. 08/085,264 entitled "System and Method for Providing Multimedia Quality of Service Sessions in A Communication Network" which was incorporated by reference above. This quality of service parameters include: Connection delay, connection establishment, failure probability, through put transit delay, residual air rate, transfer failure probability, connection release delay, connection release failure probability, protection, priority and resilient. Parameters of particular interest to the resource reservation system table described below are through put, burst and delay. Through put is the average amount of information passed through communications link at a given period of time. Burst is the maximum amount of information passed through the communications link in a short period of time. A delay is the maximum amount delay which can be tolerated, typically due to the buffer size in relation to through put. The default quality of service parameters may be provided for each type of multimedia file. The resource reservation system has an initialization file in which these parameters may be stored. They may be based on default values, values entered in by the user or system administrator or calculated values based on the number of frames, frame rate and other characteristics of the multimedia file.

FIG. 4 also shows a preferred layered open systems interconnection model showing the relationship of components of the subject invention to the layers and to the data processing system. An application program 100 on a client system seeks a file to be accessed through a file system application program interface (API) 1 or to a redirector 104. The redirector determines whether the file is located on the client system or a remote system such as the server system. If the file is located on the client system, the redirector then accesses a local file system (not shown). If the file is located on the server system, then the redirector passes a request for access to the desired file to the server system through a communications transport layer 106 (such as NetBIOS or TCP/IP) to a network adapter device driver 108. The network device driver then sends the request to the server system through a network adapter 109 across a communications link 110 (such as ethernet or token ring) to the server system network adapter 112 and network adapter device driver 114. The network adapter device driver then passes the request on to the communications transport 116. The communications transport then passes the request on to a high performance file system (HPFS) 118. The high performance file system then passes the file request onto a resource reservation system (RRS) 102. The resource reservation system then determines whether there are any quality of service parameters for the requested file. If not, then the resource reservation system so notifies the high performance file system. The high performance file system then accesses the file through a local file system to a local disk drive (not shown). If the resource reservation system determines that there are quality of service parameters for the requested file, then the resource reservation system then automatically reserves the appropriate resources to ensure that the quality of service for the file is maintained. This process will be described in detail below. The resource reservation system so notifies the high performance file system. The high performance file system then opens and accesses the file through a local file system to a local disk drive. Access to the file is then provided to the requesting application program, with quality of service guarantees if established, and the application program is so notified. This notification occurs through comunications transport 116, network device driver 114, network adapter 112, communications link 110, network adapter 109, network device driver 108, communications transport 106, redirector 104, and file system API 102. Please note that the elements of the client and server systems are shown corresponding to layers of the OSI model described above. In addition, the elements of the client and host systems correspond to the elements of the data processing system described above. Elements 100–108 reside in memory of the client system and are executed by the client system processor. Network adapters 109 and 112 are communications adapters for the client and host systems respectively. In addition, portions of the network adapter device drivers may reside on and be executed by the network adapters. Communications link 116 may be a network such as Ethernet or Token ring. Elements 114–120 reside in memory of the server system and are executed by the server system processor.

It will be noted there are other implementations in the art of such an OSI reference model bearing varying degrees of similarity. This new session 90 to carry the multimedia data associated with device 2, 86, at a guaranteed QOS.

The process begins with the request to retrieve the initialization file in step 250 This process is usually invoked prior to the configuration process described with reference to FIGS. 6A–6C or the update process described with reference to FIG. 7. In step 251, a test is performed to determined whether the initialization file is found, if not, a new initialization file (rrs.ini) is created and the appropriate defaults such as the defaults for AVS, AVI and VOC files in steps 255, 256 and 257 are written to the new initialization file. Also, system defaults such as defaults for a SCSI disk drive can be written to the initialization file if the system architecture is known. As will be discussed below, various operating system and transport system functions keep tables of the system configuration which could be consulted to build the initialization file. After the defaults are written to the new initialization file, the process returns to the test in step 251, which will succeed this time, and proceed to read the initialization file in step 263. The resource reservation system, by reading the initialization file, will be able to determine whether the devices have been configured. If they have not been, in step 267 the configuration process begins as described in association with FIGS. 6A–6C. If the devices have been configured, in step 269, the device capabilities table is built. The process ends in step 271.

Table 1 depicts a sample rrs.ini file based on default parameters.

TABLE 1

Initialization File

```
[FILE]
    fileext = AVI
    readtput = 175000
    readburst = 64000
    WriteBurst = 0
    WriteTPut = 0
[DISK]
    DISKNUM = 1
    DISKTYPE = SCSI
    XferRate = 1000000
[MACHINE]
    CPUTYPE = I486
    CPUSPEED = 33
    Bustype = MCA
[FILE]
    FILEEXT = AVS
    READTPUT = 150000
    readBURST = 64000
    writeburst = 0
    writetput = 0
[NETWORK]
    ADAPTER = 0
    Reservable = 80
```

In the example above, parameters for an AVI file disk, machine, an AVS file and network adapters are given. Other parameters such as a disk controller, system bus or system memory could be included in the default parameters for initialization file. The first file parameters (AVI) are default values for the Video for Windows AVI files. In the table, all the AVI files have a default throughput of 175000 bps and a default burst size of 64000 bps as defined by the readBurst variable The WriteBurst and WriteTPut variables are used for files to which the user can write in addition to reading. Generally, a user can not write to an AVI file so these values are set to zero.

The number of the disk on the server can be defined within the disk parameter using the DISKNUM variable. The disk type such as SCSI is set by the or the DISKTYPE variable. Further, the transfer rate of the disk drive which is important in allocating multimedia disk resource is set to 1000000 Bps. For computers which will not provide information on CPU type and speed through the use of operating system API calls, the machine set of variables can be used to define the CPU type, CPU speed and BUS type of the server.

In the table, a second file, an action media II AVS file is defined as having a readput of 150000 and a readBURST of 64000. Finally, the adapter which connects the server to the network includes an adapter name set to zero by convention. Finally, a certain amount of the network adapter capacity which can be set to a default reservable value.

Figure 6A:
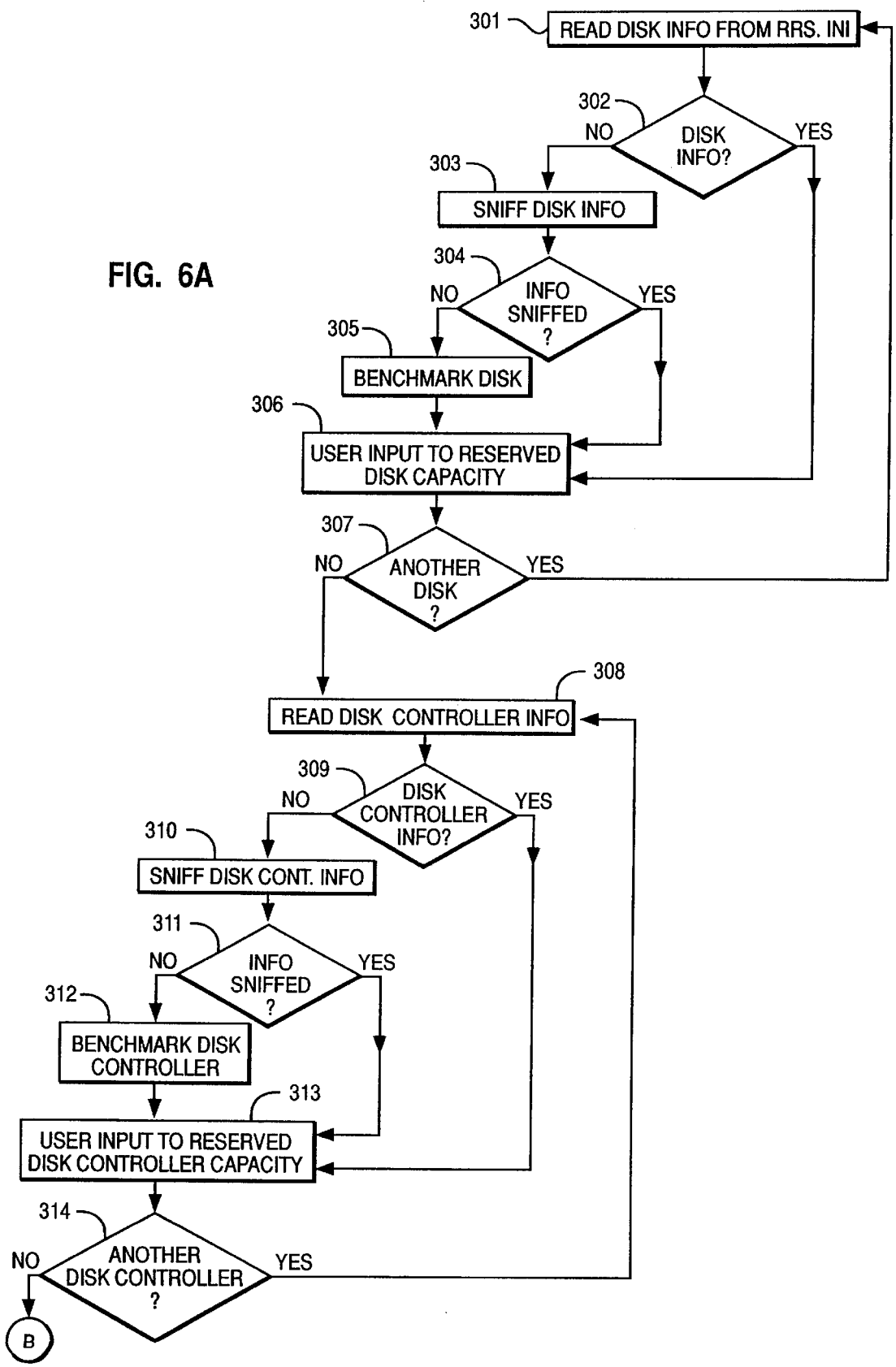
FIGS. 6A–6C depict configuration process.
Figure 6B:
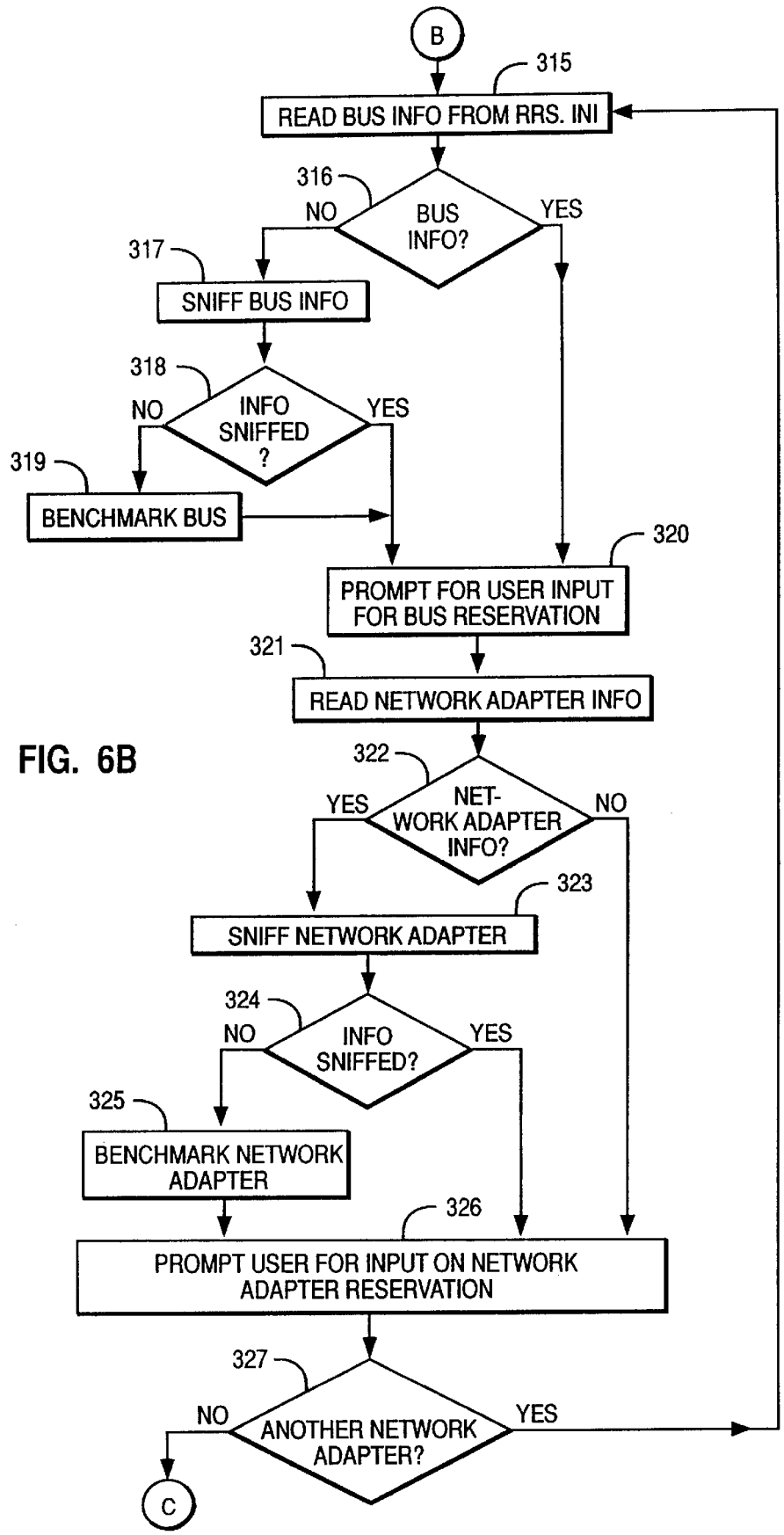
Figure 6C:
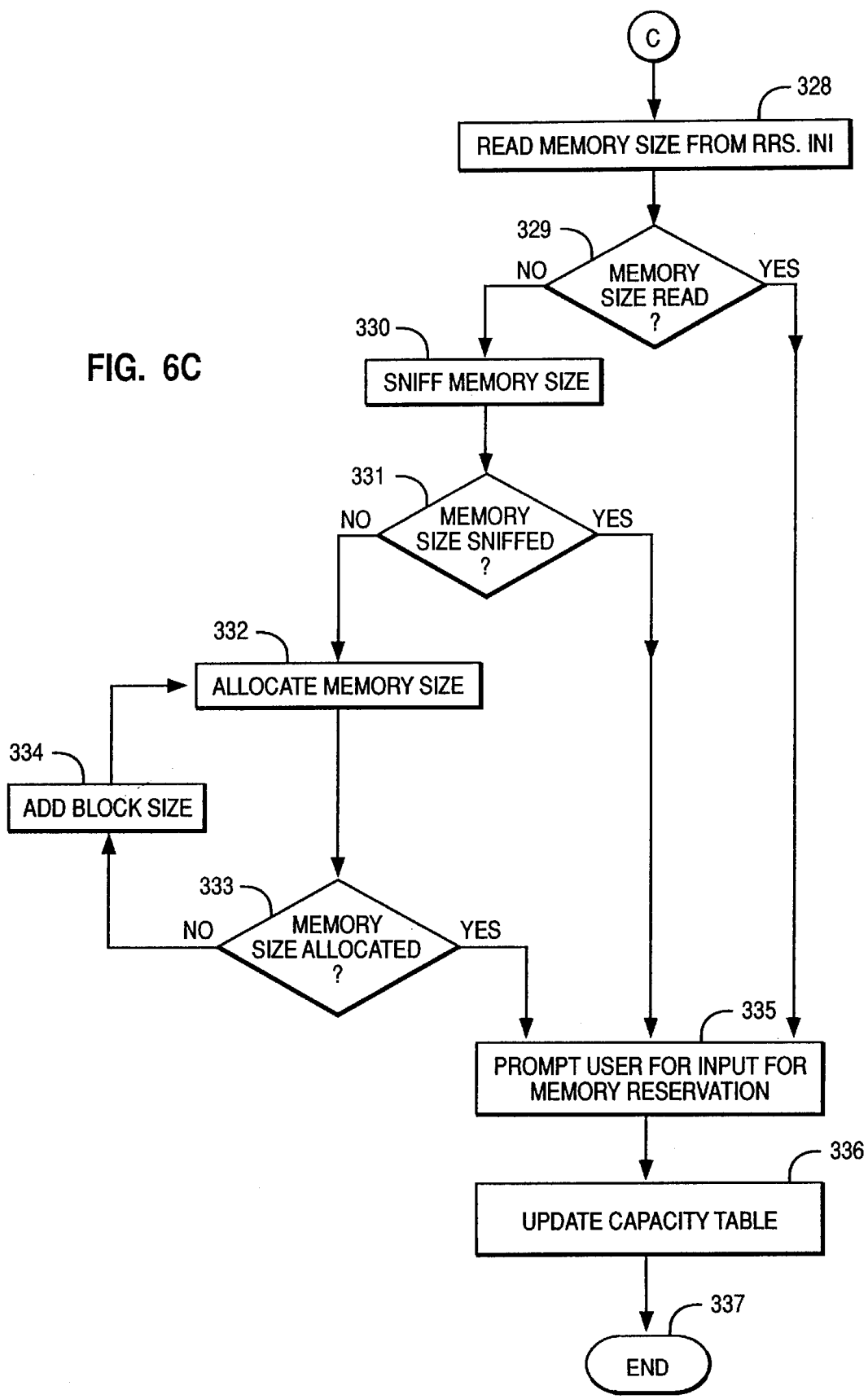

The process by which the configuration subsystem parses the initialization file and stores information concerning the device, connectivities, speeds and reservable capacity in an updated initialization file and in the log file is depicted in FIGS. 6A–6C. The process begins in step 301 where information on the disks attached to the system is searched in the initialization file. In step 302, a test is performed to determine whether there was any disk information in the initialization file. If not, in step 303, the configuration subsystem searches the system or network for disk information. OS/2 and other computer operating systems provide APIs for determining which peripheral devices are connected to computer system, their interconnection, such as disks to a SCSI controller, their speed and other characteristics. Further, other software subsystems contain files about the computer system on which they are operating. This process is called "sniffing". The sniffing process may need to be supplemented by databases within the resource reservation system which contain the required information on the system resource by device type. Alternatively, and possibly preferably, the benchmarking process described below is used to more accurately determine the system resource capability within the system environment itself. Because resource capabilities will differ due to other resources in the system, benchmarking is believed to be the most accurate means of determining resource capability. In step 304, a test is performed to determine whether the disk information was successfully determined. In step 305, which is performed if the disk information was not successfully determined in step 303, the disk is benchmarked. Next, in step 306, the user is asked to select the proportion of capacity to be reserved for realtime multimedia traffic. Preferably, this is done through graphical user interface as will be discussed below. A default or calculated value for the maximum amount of the resource which can be reserved for multimedia traffic is entered in the initialization file in the absence of user input. The benchmarking process can be designed to output not only the maximum capacity of the resource, but also the maximum percentage of the resource which can be safely reserved for multimedia traffic. In step 307, a test is performed to determine whether another disk is attached to the system. If so, steps 301 through 306 are repeated until information for all the disks have been entered.

The process proceeds to step 308 where disk controller information is read in from the initialization file. Next, in step 309, a test is performed to determine whether any disk information was found in the initialization file. If not, system is sniffed for disk controller information in step 310. Next, in step 311, a test is performed to determine whether disk control information was successfully located in the "sniff" test.

If not, in step 212, the disk controller is benchmarked. In step 313, the user is prompted through the graphical user interface for the maximum proportion of the disk controller capacity to be reserved for multimedia traffic. In step 314, a test is performed to determine whether another disk controller is attached, if so, steps 308 through 313 are repeated until information for all disk controllers has been entered in the initialization file.

Referring now to FIG. 6B, in step 315, the bus information is read from the initialization file. In step 316, a test is performed to determine whether there is any bus information in the initialization file. If not, in step 317, the bus information is determined by a "sniff" test of the system or network. In step 318, a test is performed to determine whether the bus information was successfully ascertained. If not, the bus is benchmarked in step 319. In step 320, the user is prompted through the GUI for the proportion of the system bus to reserve for multimedia applications.

The process continues to step 321 where network adapter information, if any, is read from the initialization file. In step 322, the configuration subsystem determines whether there was any network adapter information in the initialization file. If not, in step 323, the network adapter information is sniffed on the system. In step 324, a test is performed to determine whether the network adapter information was successfully sniffed. If not, in step 325, the network adapter is benchmarked. In step 326, the user is prompted for the maximum proportion for the network adapter bandwidth to reserve for multimedia traffic. In step 327, a test performed to determined whether there is another network adapter configured on the system. If so, the process returns to step 321 and repeats steps 321 through 326 until all information for network adapters have been determined.

Referring now to FIG. 6C, in step 328, the memory size from the initialization file is read into the configuration subsystem. A test is performed in step 529 to determine whether the memory size was successfully read, if not, in step 339 the memory size on the server is sniffed. In step 330 a test is performed to determine whether the memory size was successfully determined. If not, in step 332, an attempt is made to allocate a memory block specifically for multimedia information. In step 333, a test is performed to determine whether the block of memory was successfully allocated. If so, in step 334, the block sizes are added to the amount of total memory reserved for one purpose or another.

In step 335, the user is prompted for the amount of total memory to reserve. In step 336, the capacity table is updated and the process ends in 337.

The "sniff" test and benchmarking procedure are described in greater detail below. However, the applicants are using preexisting techniques to implement this portion of their invention.

Most modern computer systems provide interfaces to user programs that allow the programmer to determine the system physical configuration. These interfaces are commonly called "Device Sniff" interfaces, and are usually implemented as an input/output control (abbreviated IOCtl) entry point to the device's driver.

The multimedia Resource Reservation System (RRS) uses these IOCtls to determine the capabilities of the devices that it is reserving. For disk and disk controllers, the RRS needs to know the maximum available throughput for each disk and the total throughput of each disk/controller combination. The sniff test performed by the RRS is able to identify all physical disk drives in the system, and is also able to tell which disks are attached to each physical disk controller. An realtime systems become more prevalent, disk manufacturers may provide throughput information directly on the disk itself. If this is the case, then the sniff test will be able to retrieve the throughput data directly. If that data is not available, then at least the physical disk identity and its controller attachment can be recorded by the sniff procedure and used as input to the benchmarking process (described below).

The RRS also needs to know the throughput of the networks to which the server is attached, and the throughput of the system bus. These values may also be determined by a sniff test: the network adapters may be identified by network type and throughput (e.g.,: 16 Mbps Token Ring, 10 Mbps Ethernet, 100 Mbps FDDI, etc.), and the bus type may be determined (e.g.,: 40 Mhz Microchannel, 33 Mhz EISA, 8 Mhz ISA, etc.). Both of these sniffs are performed through IOCtls provided by the respective device drivers.

More information on hardware sniffing may be found in "IBM OS/2 2.0 Independent Hardware Vendors DASD/SCSI Device Support" Chapter 9, "TESTCFG.SYS—Adapter Presence Check Services", available upon request from the IBM Corporation.

If the exact throughput values for disk and disk/controller combinations are not available (neither via direct configuration by the user nor by sniff), then the disk and controller devices may be "benchmarked". This process determines the maximum throughput of the disks and controller in the system by issuing a series of random read accesses to the disks and controllers being benchmarked, and measuring the time each access requires to complete. After enough data has been gathered, that is, enough reads have been performed, a statistical model of the disk and controller performance characteristics can be built. This model shows the maximum throughput each disk and disk/controller combination is capable of sustaining. This data is then recorded in the RRS system configuration file, so the benchmarking process will not need to be repeated every time the RRS starts.

One of the results of the configuration process is an updated initialization file which is used to build the resource capabilities table within the resource reservation system table described below in connection with FIG. 9. The updated initialization file is dumped into a log file an example of which immediately follows:

TABLE 2

Log File
Sample rrs.log file Contents

| | |
|---|---|
| 05/06/1993 16:53:28 | Subsystem NETBEUI_A584EA0 Added |
| 05/06/1993 16:53:28 | 33 MHz 486 MCA Computer is Configured with Resource Id A582678 |
| 05/06/1993 16:53:29 | 4Mbps 802.5 Network Adapter #0 is Configured with Resource Id A582698, |
| 05/06/1993 16:53:29 | 2.250 MBps SCSI Disk #1 is Configured with Resource Id A5827DE, Controller is #1 is #1 |
| 05/06/1993 16:53:29 | AVI Files Configured for Automatic Reservation, QOS is <175000 64000> |
| 05/06/1993 16:53:29 | AVS Files Configured for Automatic Reservation, QOS is <150000 -1> |
| 05/06/1993 16:53:29 | Disk Map is Configured:<br><0 0 1 1 1 1 0 0 0 0 0 0 0 0 0 0 0 0 0 0 0 0 0 0 0 0> |
| 05/06/1993 16:54:11 | Subsystem HPFS386_A584EE0 Added |

The configuration subsystem parses the initialization file described above and reports the device, connectivities, speeds and amount of reserved capacity in a log file such as that depicted in Table 2. Thus, the log file provides a means for the system to verify the configuration provided in the initialization file. It is also used to determine how disks are configured and report network, disk and other device speeds to the system administrator. In the table, software systems such as a protocol driver (NetBeui) or a high performance file system (HPFS) control access priority service based on the controls of the OS/2 resource reservation system. Also shown in Table 2 is a disk map which shows which logical devices are connected to which physical disks. A 1 indicates that a connection takes place. After the configuration process, the network allows multimedia normal traffic to traverse between workstations. In the event that the system administrator determines that the resources are not allocated optimally, the resource reservation system allows the network to be tuned. Reasons why the system administrator may wish to tune the network include, insufficient reservation of resources, which will cause glitches and jitter in the multimedia sessions or too much reservation of resources which prevents normal data transfer from occurring.

Figure 7:
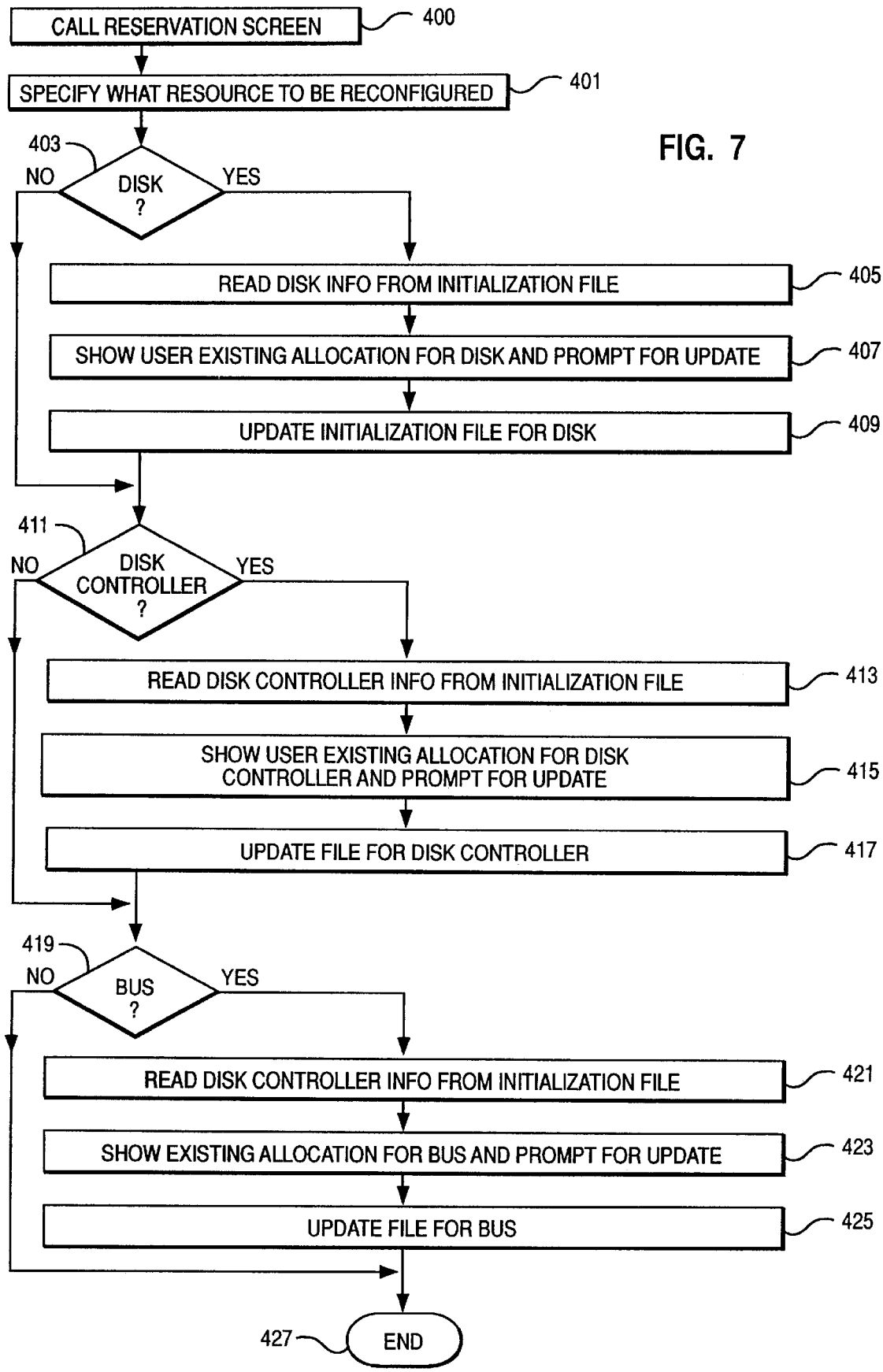
FIG. 7 is a flow diagram of the process to modify the maximum resource reservation percentages for plurality of system resources.
Figure 8:
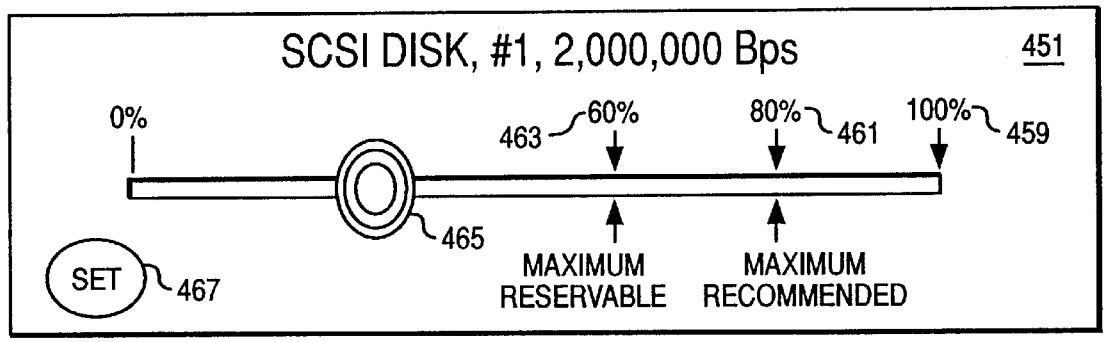
FIG. 8 is a graphical user interface which allows the system administrator or user to adjust the resource reservation percentages as described in the process of FIG. 7.
Figure 8:
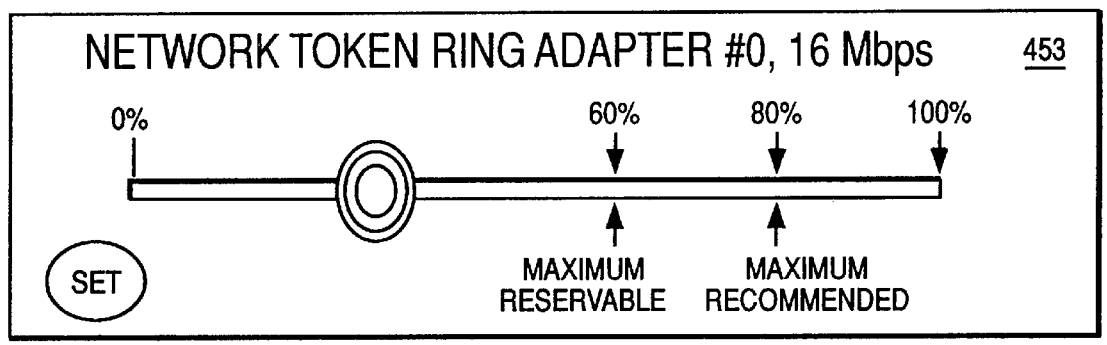
Figure 8:
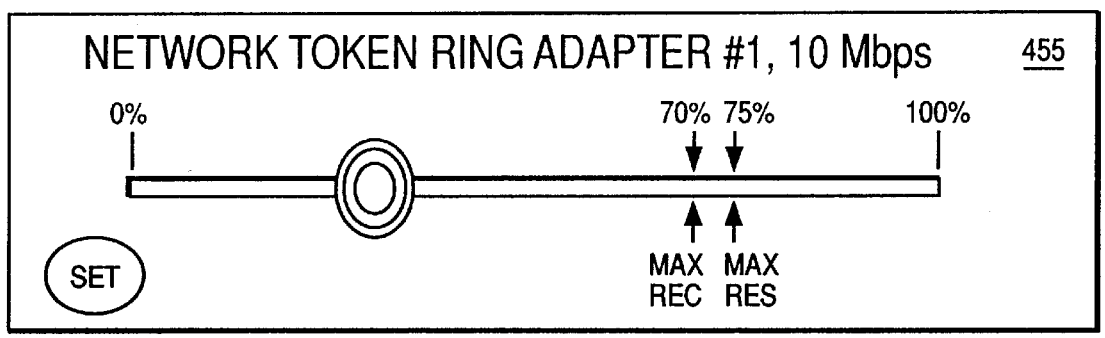
Figure 8:
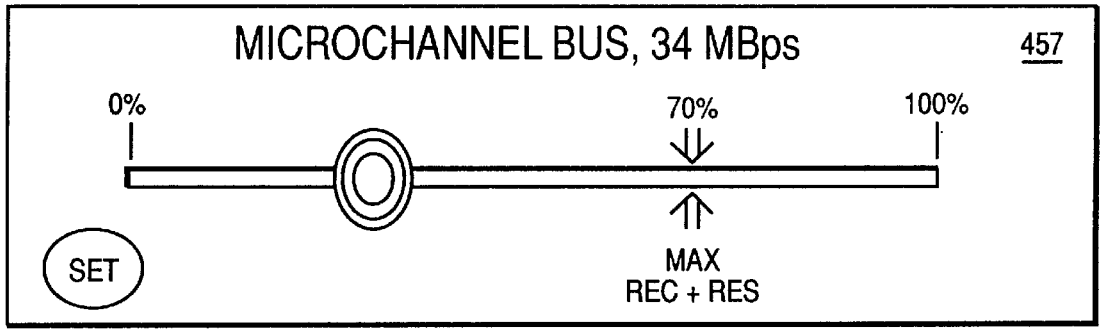

Referring to FIG. 7, in step 400, the system administrator invokes the reservation screen. The reservation screen can be a simple command line interface which queries the user as to what resources are to be reconfigured, or it can be a graphical user interface as depicted in FIG. 8. In any event, the process proceeds to prompt the user for which system resource or network resource needs to be configured, step 401. In step 403, a test is performed to determined whether the resource is a disk. If so, in step 405, the disk information from the initialization file is read. The user is shown the existing allocation for the multimedia traffic on the particular disk in question and prompts the user for an update. In step 409, the initialization file for the disk is updated in response to the user input. i.e. alphanumeric input from the keyboard or by manipulation of elements within the graphical user interface with a pointing device. A test is performed in step 411 to determine whether the user wishes to reconfigure the disk controller, this may follow an unsuccessful test in step 403 or the disk update in the initialization file in step 409. It is possible that the user interface would allow the user to specify that more than one resource is to be configured during this session. If the user wishes to reconfigure the disk controller in step 413, the disk controller information is read from the initialization file. The user is shown the existing allocation for the disk controller and prompted to update the information, step 415. In response to user input, the initialization file is updated for the disk controller in step 417. The process proceeds to step 419, to determine whether the user wishes to update the bus information. If so, the disk controller information is read from the initialization file, in step 421. The user is shown the existing allocation for the bus and prompted to update, step 423. Finally, the file is updated in step 425. Although the figure shows only disk, disk controller and bus resources, other resources, such as the network adapter and server memory can also be configured. After all the resources have been successfully reconfigured, the initialization file is updated and the new results are dumped in the log file. The process ends in step 427.

An example of a change to the resource reservation and capacity parameters as they would be reflected in the initialization and log files depicted above in Tables 1 and 2 are given below in Tables 3 and 4. Assume that the transfer rate of disk #1 is increased and that the proportion of network bandwidth that can be reserved is decreased as follows:

TABLE 3

Initialization File

```
[FILE]
    readtput = 175000
    fileext = AVI
    readburst = 64000
    writeburst = 0
    writeput = 0
[DISK]
    DISKNUM = 1
    DISKTYPE = SCSI
    XferRate = 1800000        ; ... was 1 MBps, now it is
                                1.8 MBps
[MACHINE]
    CPUTYPE = I486
    CPUSPEED = 33
    Bustype = MCA
[FILE]
    READTPUT = 150000
    READBURST = 64000
    FILEEXT = AVS
    writeburst = 0
    writeput = 0
[NETWORK]
    ADAPTER = 0
    eserved = 60              ; ... was 80% now it's 60%
``` so that disk #2 now has reservable capacity set to 1,800,000 bytes per second, and network adapter #0 is set to 60%. This is what would be reported in the rrs. log or log file.

TABLE 4

Addition to Log File

| | |
|---|---|
| 05/06/1993 16:58:47 | 33 MHz 486 MCA Computer is Configured with Resource Id A60389E |
| 05/06/1993 16:58:47 | 4 Mbps 802.5 Network Adapter #0 is Configured with Resource Id A6038BE, R 300000 |
| 05/06/1993 16:58:47 | 1.800 MBps SCSI Disk #1 is Configured with Resource Id A603A2A, Controller is #2, R 1800000 |
| 05/06/1993 16:58:47 | AVI Files Configured for Automatic Reservation, QOS is <175000 64000> |
| 05/06/1993 16:58:47 | AVS Files Configured for Automatic Reservation, QOS is <150000 −1> |
| 05/06/1993 16:58:47 | Disk Map is Configured: <..1 1 1 1 2............ ........> |

In this log file, the reservable throughput of disk #2 is reported to be 1,800,000. And the reservable throughput of network adapter #0 is 3,000,000 bytes per second (or 2,000,000 bits per second which is 60% of a 4 Mbps Token Ring).

The system log file generated by the configuration subsystem is useful for the system administrator to monitor the communication on the network. Initially after the devices are configured as shown in FIGS. 6A–6C, the resulting initialization file is dumped into the log file. System traffic such as the beginning and ending of sessions, multimedia or otherwise, are also continuously logged in the log file. Changes to the initialization file are also logged. Further, errors or problems in initiating a multimedia session, for example, insufficient bandwidth on a particular device can also be logged into the log file. Other problems including normal traffic being refused because of an overly large multimedia reservation on a particular resource can also be detected in the log file. The log tile provides this means to monitor system performance and determine the need to adjust the resource maximum reservable percentage of the resource for multimedia traffic.

In FIG. 8, a GUI which allows the system administrator or user to adjust the plurality of resource reservation percentages is depicted. The GUI 450 has 4 sliders 451, 453, 455 and 457 which respectively control the resource reservation for a SCSI disk, a first net adapter, a second net adapter and a microchannel system bus. In the slider, a scaled line is presented in which percentages are given for total capacity (100%) 459, a recommended maximum reservable percentage 461 and the current maximum reservable percentage 463 for multimedia applications. The percentage numbers can also be given in terms of absolute values of resource capability. The maximum recommended parameter is the judgement of the system designer as to the behavior of typical disk network adapters or buses, believing that reservation allocations above that amount would cause normal traffic to deteriorate. As discussed above, the benchmarking process can also be used to determine the maximum recommended percentage. The current maximum reservable amount is the actual amount of the resource which can currently be reserved for multimedia traffic. The current maximum reservable percentage results from a default (which may be the maximum recommended percentage) or user input during the configuration process described above. However, because technology continually evolves, the user is not constrained against setting the current maximum reservable portion of the resource above the recommended amount. To change the maximum reservable amount the user manipulates a pointer from a pointing device such as a mouse over the knob 465, grabs the knob, moves it over the maximum reservable pointer 463, holds the mouse button, drags it to the desired value along the slider bar 451, and releases the button. If the value is correct, he moves the mouse pointer over to the set button 467 and activates it. The change would also be logged in the log file as well as being changed in the initialization file. Notice that the current maximum reservable percentage for the disk is 60% below the 80% maximum recommended value. The maximum reservable amount for the net adapter, #1 is at 75% above the 70% maximum recommended percentage and the maximum reservable amount for the bus is set equal to the maximum recommended amount at 60%. Other graphical user interfaces, such as a spin wheel could be used. A spin wheel is described in *The Common User Access* 1993 *Guidelines* available from the IBM Corporation.

FIG. 9 shows the resource reservation table 500 which includes a capacity table 501 and a current reservations table to the right. The capacity table is built from the initialization file, and includes information on the resource type 505, and its location 507 which is often denoted by a numeral. The capacity of the resource 509 and the percentage of the capacity 511 which is devoted to multimedia traffic are also included in the capacity table. The current reservation table side 503 is a subject of commonly assigned, copending application entitled "Method and Apparatus for Reserving Resources to Assure Quality of Service" Ser. No. 08/084,053 to M. Baugher et. incorporated above by reference and is described in much greater detail therein. The current reservations table 503 is also built from the initialization file using the characteristics of the different multimedia files. The current reservations table includes information on a session number 513, the throughput 515, the burst rate 515 and allowable delay 517.

Figure 10:
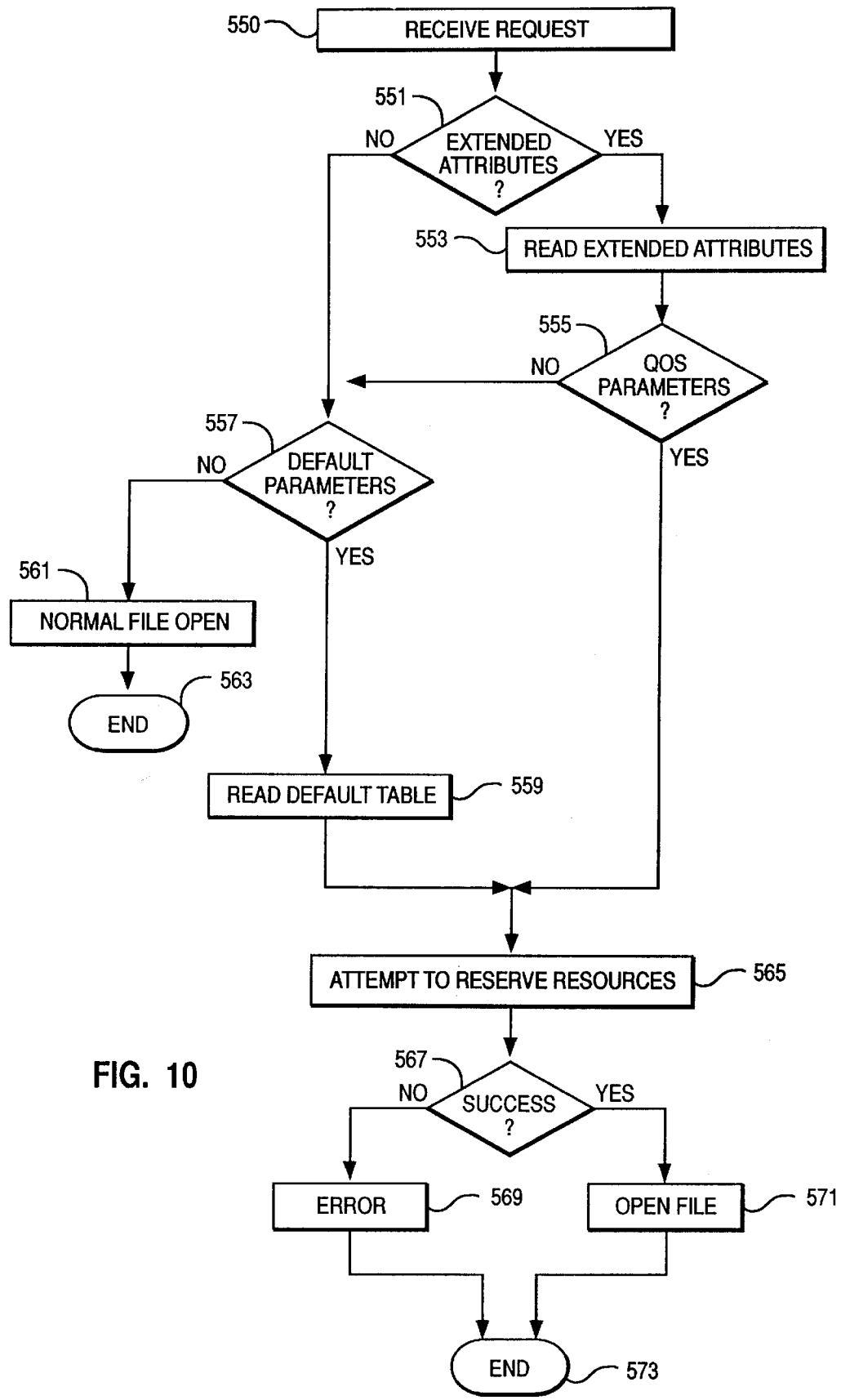
FIG. 10 is a flow diagram for building the current reservations side of the resource reservations system table.

FIG. 10 depicts one method for building the current reservations table side of the resource reservation system table. In response to a request in step 550 to start a session, a system will perform a test in step 551 to determine whether an extended attributes extension to the header of the multimedia file can be found. In many operating systems including OS/2, an extended attributes field allows a programmer to input many characteristics of the file such as quality of server parameters, which are not part of the standard file attributes. If there are extended attributes, in step 553, they are read and in step 555, a test determines whether the multimedia application has quality of service parameters associated therewith. If so, an attempt is made to reserve the necessary resources in step 565.

If there are no quality of service parameters in the extended attributes field, the process proceeds to step 557 to determine whether default parameters exist for the multimedia application within the initialization file. These default parameters may be derived from the file extension which indicates what type of file it is, e.g., AVS, AVI, Voice and so forth, or it may be derived by benchmarking the application by determining the number of frames, the frame rate and other parameters to calculate what the necessary quality of service would be required to be. If the initialization file has default parameters, these are read in step 559. The process proceeds to step 565 to attempt to reserve the necessary resources. In step 561, the resource reservations system assumes that the file is a normal file and follows normal procedures for opening the file and transmitting it over the network. The process ends in step 563. The success or failure of opening the normal file in step 561 may be recorded in the log file started by the configuration process above. If the file was a multimedia file, the attempt to reserve the necessary resources is tested in step 567. If the attempt was unsuccessful, an error condition is generated in step 569 and a log entry is made in the log file. If the attempt was successful, the file was opened and entries made in the log file and an entry is made in the current reservations table that a session was started for the multimedia application. The necessary percentage of the varied system resources required to maintain quality of service for the application are also entered in the current reservations table. The process ends, step 573.

While the embodiments above have been described primarily in terms of a system administrator changing the maximum reservable percentage of a system resource at the server machine, it is possible to configure the system so that a user would be able to adjust the maximum resource reservation value as well. The resource reservation system might test the user's credentials requiring a certain authority level. Alternatively, the user may be allowed to reserve resources on his or own personal workstation, but not server resources. Further, other network resources located at the workstations or elsewhere in the network such as bridges or routers could similarly be reserved by the present invention.

Yet further, the invention finds application in a standalone computer environment in which a multimedia tasking operating system is found. Current technology exists to create a continuous streaming television or video picture within a window on the system display, displaying, for example, a television news broadcast or movie video from a VCR. Concurrently, the user can be performing application tasks such as manipulating a spreadsheet or performing word processing. The user wishes to guarantee that neither the spreadsheet nor the video be impaired by loss of data or reduction in quality of service. Thus, the present invention could be used to set the maximum reservable resources for the stand alone system.

While the invention has been described with respect to particular embodiments above, it will be understood by those skilled in the art that modifications may be made without departing from the spirit and scope of the present invention. These embodiments are for purposes of example and illustration only and are not to be taken to limit the scope of the invention narrower than the scope of the appended claims.

We claim:

1. A system for adjusting a resource reservation allocating a system resource between multimedia and normal traffic comprising:

means for configuring the system resource according to an initialization file, wherein a current maximum resource reservation value is set for the system resource representing a portion of the system resource which can be reserved for all of the multimedia traffic utilizing the system resource, a remainder of the system resource allocated to normal traffic;

means for updating the initialization file to reflect the system resource configuration; and means for building a device capabilities file including resource capabilities information about the system resource including the current maximum resource reservation value.

2. The system as recited in claim 1 wherein the initialization file contains a read throughput value for at least one multimedia file and the current maximum resource value for the system resource.

3. The system as recited in claim 1 further comprising:

means for parsing the initialization file for information concerning connectivity, speed and reservable capacity of the system resource;

a graphical user interface for accepting user input regarding connectivity, speed and reservable capacity information;

means for sniffing the computer system for information missing from the initialization file; and means for building an updated initialization file from the parsed information, the sniffed information and the user input to the graphical user interface.

4. The system as recited in claim 3 further comprising:

means for building a resource reservation capabilities table including information on system resource type, resource capacity and the current maximum resource reservation value; and means for building a current reservations table including information on session number, file throughput, file burst rate and allowable delay for a multimedia file.

5. The system as recited in claim 1 further comprising means for updating a log file from the updated intialization file.

6. The system as recited in claim 1 further comprising:

means for reading the installation file to determine whether the system resource has been configured;

wherein the means for configuring the system resource is responsive to a determination that the system resource has not been configured.

7. A computer program product in a computer readable medium for adjusting a resource reservation allocating a system resource between multimedia and normal traffic comprising:

means for configuring the system resource according to an initialization file, wherein a current maximum resource reservation value is set for the system resource representing a portion of the system resource which can be reserved for all of the multimedia traffic utilizing the system resource, a remainder of the system resource allocated to normal traffic;

means for updating the initialization file to reflect the system resource configuration; and means for building a device capabilities file including resource capabilities information about the system resource including the current maximum resource reservation value.

8. The product as recited in claim 7 wherein the initialization file contains a read throughput value for at least one multimedia file and the current maximum resource value for the system resource.

9. The product as recited in claim 7 further comprising:

means for parsing the initialization file for information concerning connectivity, speed and reservable capacity of the system resource;

a graphical user interface for accepting user input regarding connectivity, speed and reservable capacity information;

means for sniffing the computer system for information missing from the initialization file; and means for building an updated initialization file from the parsed information, the sniffed information and the user input to the graphical user interface.

10. The product as recited in claim 9 further comprising:

means for building a resource reservation capabilities table including information on system resource type, resource capacity and the current maximum resource reservation value; and means for building a current reservations table including information on session number, file throughput, file burst rate and allowable delay for a multimedia file.

11. The product as recited in claim 7 further comprising means for updating a log file from the updated intialization file.

12. The product as recited in claim 7 further comprising:

means for reading the installation file to determine whether the system resource has been configured;

wherein the means for configuring the system resource is responsive to a determination that the system resource has not been configured.

13. A method for adjusting a resource reservation allocating a system resource between multimedia and normal traffic comprising the steps of:

configuring the system resource according to an initialization file, wherein a current maximum resource reservation value is set for the system resource representing a portion of the system resource which can be reserved for all of the multimedia traffic utilizing the system resource, a remainder of the system resource allocated to normal traffic;

updating the initialization file to reflect the system resource configuration; and building a device capabilities file including resource capabilities information about the system resource including the current maximum resource reservation value.

14. The method as recited in claim 13 wherein the initialization file contains a read throughput value for at least one multimedia file and the current maximum resource value for the system resource.

15. The method as recited in claim 13 further comprising the steps of:

parsing the initialization file for information concerning connectivity, speed and reservable capacity of the system resource;

accepting user input regarding connectivity, speed and reservable capacity information from a user interface;

sniffing the computer system for information missing from the initialization file; and building an updated initialization file from the parsed information, the sniffed information and the user input to the graphical user interface.

16. The method as recited in claim 15 further comprising:

building a resource reservation capabilities table including information on system resource type, resource capacity and the current maximum resource reservation value; and building a current reservations table including information on session number, file throughput, file burst rate and allowable delay for a multimedia file.

17. The method as recited in claim 13 further comprising the step of updating a log file from the updated intialization file.

18. The method as recited in claim 13 further comprising the step of reading the installation file to determine whether the system resource has been configured wherein the step of configuring the system resource is responsive to a determination that the system resource has not been configured.

* * * * *